US012642385B2

(12) United States Patent
Chan et al.

(10) Patent No.: US 12,642,385 B2
(45) Date of Patent: Jun. 2, 2026

(54) BEVERAGE MACHINE WITH CORNER USER INTERFACE

(71) Applicant: Keurig Green Mountain, Inc., Burlington, MA (US)

(72) Inventors: Wai Kean Chan, Singapore (SG); Mohan Arjonut, Johor (MY); Soy Lee Loh, Johor (MY); Fa Yong Zhong, Sichuan (CN); John Couture, Burlington, MA (US); Jason Scott Sabel, Northborough, MA (US)

(73) Assignee: Keurig Green Mountain, Inc., Burlington, MA (US)

( * ) Notice: Subject to any disclaimer, the term of this patent is extended or adjusted under 35 U.S.C. 154(b) by 884 days.

(21) Appl. No.: 17/895,165

(22) Filed: Aug. 25, 2022

(65) Prior Publication Data

US 2023/0067361 A1 Mar. 2, 2023

Related U.S. Application Data

(60) Provisional application No. 63/237,352, filed on Aug. 26, 2021.

(51) Int. Cl.
*A47J 31/44* (2006.01)
*A47J 31/52* (2006.01)

(52) U.S. Cl.
CPC ........... *A47J 31/4403* (2013.01); *A47J 31/52* (2013.01); *A47J 31/44* (2013.01)

(58) Field of Classification Search
CPC .... A47J 31/44; A47J 31/4403; A47J 31/4457; A47J 31/52

USPC .................................. 99/280, 285, 306, 307
See application file for complete search history.

(56) References Cited

U.S. PATENT DOCUMENTS

| | | | |
|---|---|---|---|
| D265,042 S | 6/1982 | Hanson et al. | |
| D304,410 S | 11/1989 | Tsuji | |
| D319,163 S | 8/1991 | Naft | |
| D321,807 S | 11/1991 | Adams | |
| D343,758 S | 2/1994 | Beeren | |
| D550,499 S | 9/2007 | Argabrite et al. | |
| D577,252 S | 9/2008 | Kotoku | |
| D586,171 S | 2/2009 | Picozza et al. | |
| D658,423 S | 5/2012 | Curtis et al. | |
| 9,060,648 B2 * | 6/2015 | Boussemart | A47J 31/52 |
| 9,149,152 B2 | 10/2015 | Cahen et al. | |
| D755,001 S | 5/2016 | Linter | |
| D777,498 S | 1/2017 | Bandixen et al. | |
| D836,371 S | 12/2018 | Cahen | |
| D849,464 S | 5/2019 | McConnell et al. | |
| 10,408,533 B2 | 9/2019 | Kim et al. | |
| D872,225 S | 1/2020 | Joo et al. | |
| D877,563 S | 3/2020 | Cauwood et al. | |

(Continued)

FOREIGN PATENT DOCUMENTS

WO WO 2019/192778 A1 10/2019

OTHER PUBLICATIONS

U.S. Appl. No. 29/805,532, filed Aug. 27, 2021, Chan et al.

*Primary Examiner* — Reginald Alexander
(74) *Attorney, Agent, or Firm* — Wolf, Greenfield & Sacks, P.C.

(57) ABSTRACT

A beverage dispenser includes a housing and a user interface disposed on a vertical corner of the housing. The user interface includes one or more buttons that are accessible from a front view and a side view of the housing.

18 Claims, 5 Drawing Sheets

(56)                    References Cited

U.S. PATENT DOCUMENTS

| | | | |
|---|---|---|---|
| D879,530 S | 3/2020 | Cauwood et al. | |
| D879,531 S | 3/2020 | Cauwood et al. | |
| D882,336 S | 4/2020 | Cauwood et al. | |
| D885,817 S | 6/2020 | Ye | |
| D893,945 S | 8/2020 | Cauwood et al. | |
| D894,660 S | 9/2020 | McConnell et al. | |
| D943,329 S | 2/2022 | Cha et al. | |
| D943,331 S | 2/2022 | Cauwood et al. | |
| D945,201 S | 3/2022 | Nalen et al. | |
| D948,911 S | 4/2022 | Cha et al. | |
| D948,913 S | 4/2022 | Cha et al. | |
| D955,797 S | 6/2022 | Nalen et al. | |
| D960,625 S | 8/2022 | Kim et al. | |
| 11,684,201 B2 * | 6/2023 | Seidl .................. | A47J 31/3676 |
| | | | 99/280 |
| 2006/0283332 A1 * | 12/2006 | Garman ................. | A23F 5/262 |
| | | | 99/279 |
| 2007/0034086 A1 * | 2/2007 | Colman ............. | A47J 31/4403 |
| | | | 99/279 |
| 2011/0168026 A1 | 7/2011 | Cahen et al. | |
| 2015/0223635 A1 * | 8/2015 | Mulvaney ........... | A47J 31/4482 |
| | | | 392/441 |
| 2018/0002153 A1 | 1/2018 | Kim et al. | |
| 2019/0216256 A1 | 7/2019 | Nabeiro et al. | |
| 2020/0154932 A1 * | 5/2020 | Rivera ............... | A47J 31/0642 |

* cited by examiner

BEVERAGE MACHINE WITH CORNER USER INTERFACE

CROSS REFERENCE TO RELATED APPLICATION

This application claims the benefit of U.S. Provisional Application No. 63/237,352, filed Aug. 26, 2021, which is hereby incorporated by reference in its entirety.

FIELD

This disclosure relates to beverage machines, such as coffee brewers that use a liquid to form a coffee beverage.

BACKGROUND

Beverage forming systems that use a liquid, such as water, to form a beverage are well known. For example, U.S. Patent Application publication 2008/0134902 discloses a beverage forming system that heats water in a reservoir and pneumatically delivers the heated water to a brew chamber for making a coffee drink or other beverage. U.S. Pat. No. 7,398,726 discloses another beverage forming system that delivers heated water from a dispensing tank to a brew chamber by pneumatic forcing of the water from the metering tank. U.S. Patent Application publications 2009/0120299 and 2008/0092746, and U.S. Pat. Nos. 3,511,166, 3,958,502, 4,602,145, 4,263,498 and 8,037,811 disclose other system types in which water in a heater tank or heat exchanger is forced to flow out of the tank and to a beverage making station by introducing unheated water into the tank/exchanger.

SUMMARY

In one aspect, a beverage dispenser includes a housing having a front face and a side face forming a corner oriented vertically on the housing. A beverage outlet may be configured to dispense a beverage along the front face. A user interface may be disposed on the corner in the vertical direction, wherein the user interface is viewable from both a front view and a side view. The corner arrangement of the user interface may allow the beverage machine to be orientated in multiple configurations when placed on a countertop or other surface. For example, the beverage dispenser may be oriented in a conventional configuration with the front face facing outwards. Alternatively, the beverage dispenser may be oriented in a sideways configuration. Such an orientation may be useful for a variety of reasons, such as providing easier access to a liquid reservoir arranged on a back side of the housing. The beverage machine may also have a relatively thin footprint measured side to side compared to front to back, and therefore the sideways orientation may also provide more counter depth space. In either the front or sideways orientation, because the user interface is positioned on the corner of the front and side faces, the user interface may be accessible.

In another aspect, a beverage dispenser includes a housing having a front face and a side face that meet at a corner oriented vertically on the housing. A beverage outlet may be arranged to dispense beverage along the front face. The beverage dispenser may include a user interface including one or more buttons that are actuatable by a user to provide operating instructions to the beverage dispenser. The one or more buttons may be arranged at the corner and may define a surface arranged at an angle to both the front and side faces. In one embodiment, the beverage outlet is defined by a brew chamber configured to receive and hold a cartridge with beverage material for use in forming the beverage. Arranging the user interface on the corner of the housing allows the beverage machine to have a relatively thin front face while maintaining sufficient distance between the beverage forming area on the front face and the user interface. For example, a user may access the user interface without passing under the beverage outlet to avoid getting splashed during a beverage forming process. Alternately, or in addition, the user can access the user interface from the side, rather than the front, thereby avoiding possible contact with beverage being dispensed.

In one embodiment, the front and side faces of the housing are planar. The surface defined by the one or more buttons may also be planar and be arranged at an angle to both the front and side faces. The buttons may be disposed in a recess within the housing along a portion of the corner. The recess may extend into the housing, providing a surface to accommodate the buttons of the user interface without increasing a width of the front face or the side face, thereby reducing the size requirements of the beverage machine. The one or more buttons may be actuatable from multiple directions, allowing the machine to be oriented in different configurations on a countertop and/or allowing a user to access the user interface from a front view or a side view.

In one embodiment the one or more buttons may be hinge mounted at a first edge such that the buttons are configured to rotate about the first edge. In some embodiments, the edge can be located at an intersection of one side of the button and the front or side face of the housing. Such a configuration may allow a user to access and compress a button with minimal effort from multiple directions.

In one embodiment, the one or more buttons are directly connected to a main control board of the beverage machine. Thus, the user interface may not require additional circuit boards or other parts to connect the buttons and send signals to the main controller to operate the machine. This minimizes the parts required and costs to manufacture the beverage machine. In some embodiments the buttons may be membrane switches, tactile switches, or capacitive touch switches. The buttons may include a light configured to illuminate when the button is pressed.

The disclosure describes a versatile, compact beverage machine with a user interface arranged on a corner of the machine housing that may be accessed from multiple directions, allowing the beverage machine to be positioned in more than one configuration on a surface.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

It should be understood that aspects of the disclosure are described herein with reference to certain illustrative embodiments and the figures. The illustrative embodiments described herein are not necessarily intended to show all aspects of the disclosure, but rather are used to describe a few illustrative embodiments. Thus, aspects of the disclosure are not intended to be construed narrowly in view of the illustrative embodiments. In addition, it should be understood that aspects of the disclosure may be used alone or in any suitable combination with other aspects of the disclosure.

Figure 1:
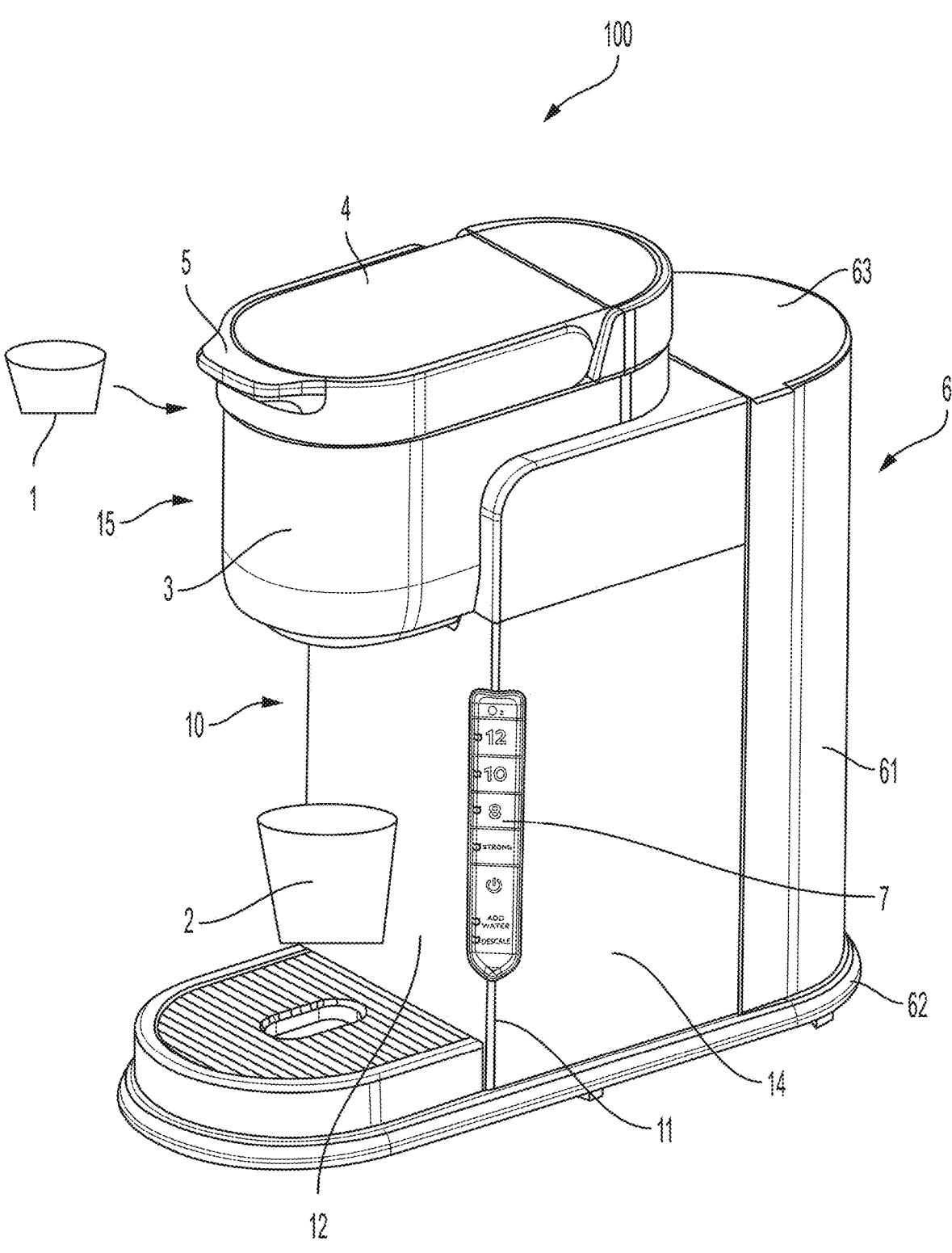
FIG. 1 is a right side perspective view of a beverage dispenser in an illustrative embodiment.

FIG. 1 shows a perspective view of a beverage machine 100 that incorporates features of the disclosure. Although the beverage machine 100 may be used to form any suitable beverage, such as tea, coffee, other infusion-type beverages, beverages formed from a liquid or powdered concentrate, soups, juices or other beverages made from dried materials, carbonated or uncarbonated beverages, or other, in this illustrative embodiment the machine 100 is arranged to form coffee or tea beverages. As is known in the art, a beverage cartridge 1 may be provided to the machine 100 and used to form a beverage that is deposited into a user's cup or other suitable container 2. The cartridge 1 may be manually or automatically placed in a brew chamber 15 that includes a cartridge holder 3 and cover 4 of the beverage machine 100. For example, the holder 3 may be or include a circular, cup-shaped or otherwise suitably shaped opening in which the cartridge 1 may be placed. With a cartridge 1 placed in the cartridge holder 3, a handle 5 may be moved by hand (e.g., downwardly) so as to move the cover 4 to a closed position (as shown in FIG. 1). In the closed position, the cover 4 at least partially covers the cartridge 1, which is at least partially enclosed in a space in which the cartridge is used to make a beverage. For example, with the cartridge 1 held by the cartridge holder 3 in the closed position, water or other liquid may be provided to the cartridge 1 (e.g., by injecting the liquid into the cartridge interior) to form a beverage that exits the cartridge 1 and is provided to a cup 2 or other container. Of course, aspects of the disclosure may be employed with any suitably arranged beverage machine 100, including drip-type coffee brewers, carbonated beverage machines, and other systems that deliver water or other liquid to form a beverage. Thus, a cartridge 1 need not necessarily be used, but instead the brew chamber may accept loose coffee grounds or other beverage material to make a beverage. Also, the brew chamber 15 need not necessarily include a cartridge holder 3 and a cover 4. For example, the brew chamber may include a filter basket that is accessible to provide beverage material (such as loose coffee grounds), and the filter basket itself may be movable, e.g., by sliding engagement with the beverage machine housing 10, and a cover 4 may be fixed in place. In other embodiments, the brew chamber need not be user accessible, but instead beverage material may be automatically provided to, and removed from, the brew chamber. Moreover, the machine 100 need not have a brew chamber 15, but instead other types of dispensing stations, e.g., that dispense hot and/or cold water (whether still or carbonated) at an outlet such as a dispensing nozzle without mixing with any beverage ingredient. Accordingly, a wide variety of different types and configurations for a dispensing station may be employed with aspects of the disclosure.

Figure 3:
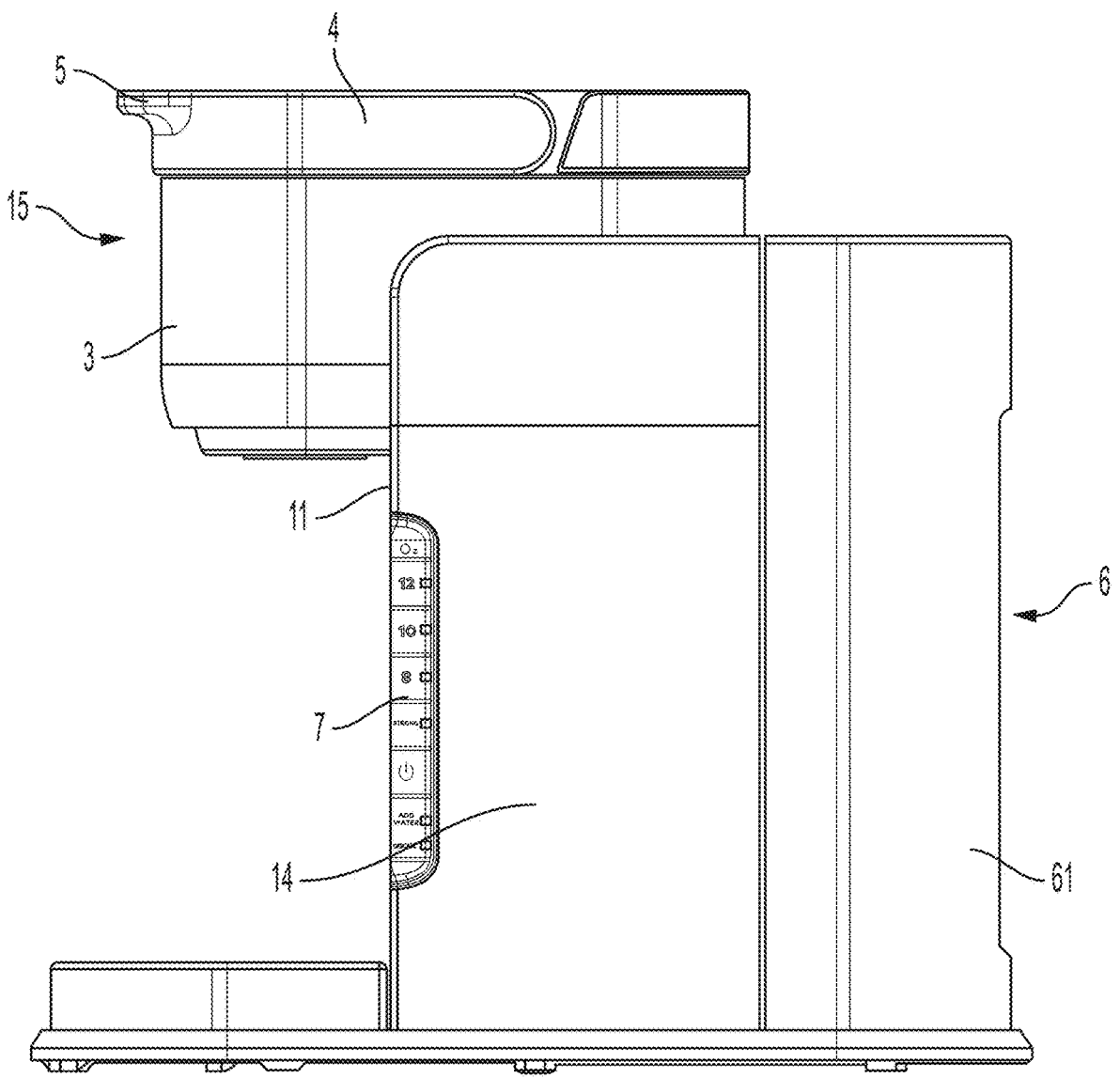
FIG. 3 is a right side view of the beverage dispenser in FIG. 1.

As shown in FIGS. 1 and 3, liquid from either an external reservoir 6 or an internal reservoir (not shown) may be provided to a brew chamber 15 or other dispensing station to dispense a beverage. For example, a user may pour or otherwise provide water to an external reservoir 6, which may then be delivered to the brew chamber 15 or other dispensing station to form a beverage. Alternately, liquid may be provided from an internal reservoir to the brew chamber 15. The internal reservoir may be provided with liquid from a mains water connection which allows the machine 100 to be connected to a plumbed water source, such as a so-called city water or mains water supply. The internal tank may be fluidly coupled to the mains water connection so that water can be delivered to and stored by the internal tank for delivery to the brew chamber 15. Both an external reservoir 6 and an internal reservoir need not be provided, however, and instead the beverage machine 100 may have only an external reservoir 6 or internal reservoir. In this embodiment, the external reservoir 6 includes a tank 61 which may be removable from a base 62, e.g., to allow the tank 61 to be more easily filled with water. The tank 6 may additionally include a tank cover 63 that is removable (e.g., pivots upwards) to allow the user to fill the reservoir with a liquid.

A user may receive information from, and/or provide information to, the beverage machine 100 via a user interface 7 on the machine housing 10, which may include a display, buttons, switches, touch screen and/or other elements for information display and reception. As described in more detail below, the user interface may be interacted with by a user to adjust one or more brew parameters used by the machine 100 to form a beverage. Such parameters may include a beverage volume, temperature, strength, time period, carbonation level, a time in the future to dispense a beverage (a scheduled brew or dispensing), and any other suitable setting used by the machine to form a beverage.

The beverage machine 100 may use a set of one or more brew parameters to form a beverage, and a set of brew parameters may include beverage-specific parameters that are definable for each particular beverage and/or configuration-type parameters that each have a value which is generally used for all or a large number of beverages formed by the machine 100. The beverage-specific parameters and/or configuration type parameters may be adjusted by a user, although if adjustable, may be adjusted in different ways. For example, a user may select or at least have the ability to adjust beverage-specific parameters for each beverage. Examples of this type of parameter include beverage volume and/or strength, although others are possible. In some embodiments, the user interface 7 may have one or more buttons or other features that enable a user to select a desired value for beverage volume, strength, etc. each time a beverage is formed and then instruct the machine 100 to start a beverage formation process, such as by pressing a "brew button" or otherwise providing instruction to start beverage formation. In response, the machine 100 will dispense the beverage using the set of brew parameters.

Figure 2:
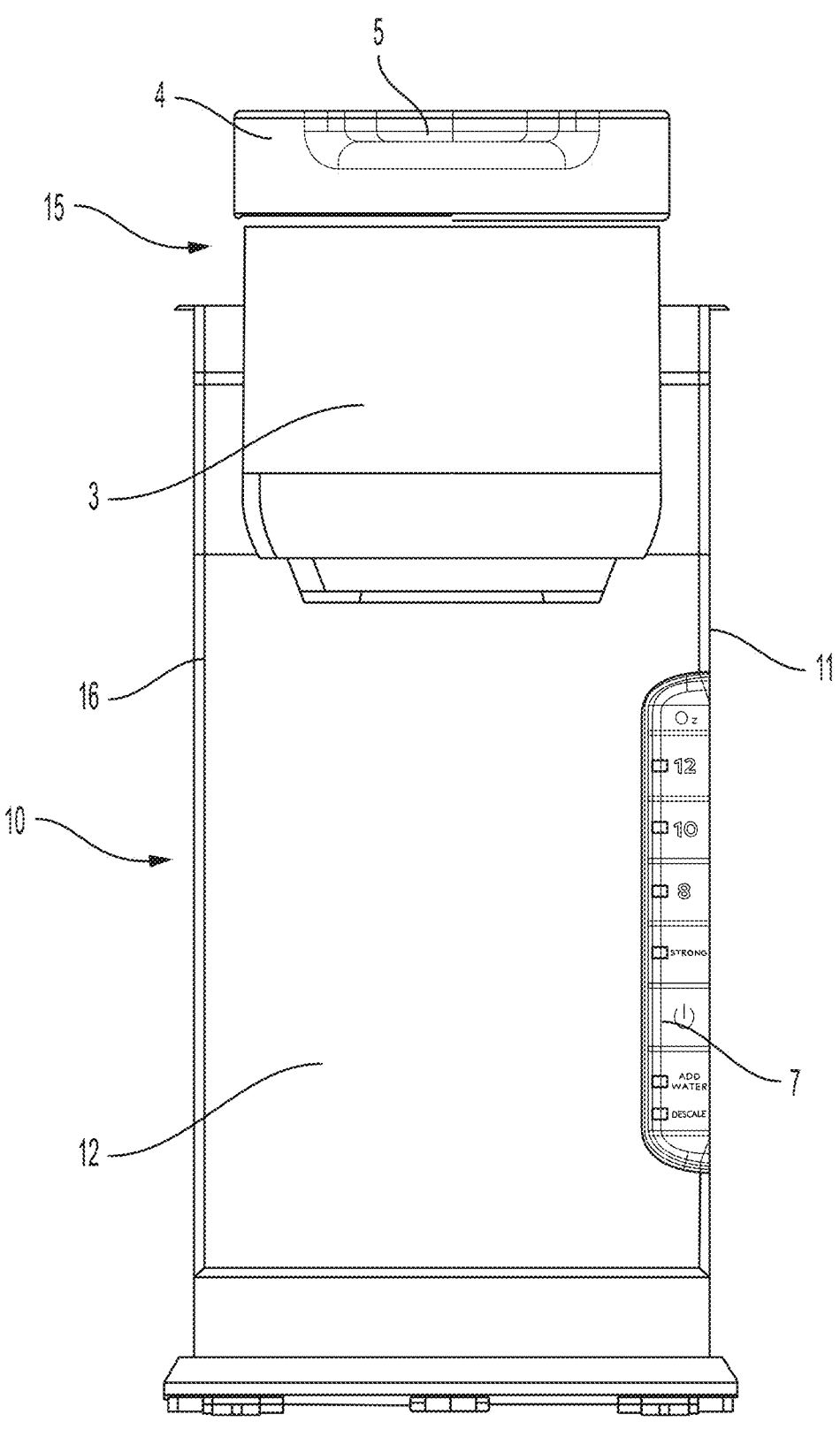
FIG. 2 is a front view of the beverage dispenser in FIG. 1.

As shown in FIGS. 1 through 3, the user interface 7 is arranged vertically on a corner 11 formed in the beverage machine housing 10. In this embodiment, the corner 11 is formed by a front face 12 and a right-side face 14 of the housing 10. Of course, the user interface 7 is not limited to such an arrangement, and the user interface may be arranged on any vertical or horizontal corner formed by two surfaces of the housing, including but not limited to the front face 12 and a left- or right-side face. By being arranged on a corner of the housing 10, the user interface 7 may be viewable and accessible from at least two sides of the machine 100. In this embodiment, the user interface is viewable and accessible from the front side (FIG. 2) and the right side (FIG. 3).

As shown in FIG. 2, the user interface 7 arranged on corner 11 is viewable and accessible from the front face 12. In other embodiments, a user interface 7 may alternatively, or additionally, be arranged on the left corner 16 between the front face 12 and left side (not shown). A user therefore may access and actuate the buttons of the user interface 7 from the front side of the machine 100. For example, the user can actuate a button of the user interface 7 using a motion that is perpendicular to the front face 12 and is parallel to the side face 14. In addition, the user can actuate a button of the user interface using a motion that is perpendicular to the side face 14 and parallel to the front face 12. Said another way, the user can actuate a button using a motion along any angle between perpendicular to the front face 12 and perpendicular to the side face 14. This is in contrast to typical user interface orientations which require an actuation motion within a much narrower angle and/or prohibit an actuation motion that is parallel to two faces of the machine housing (such as the front face and a side face). The corner placement of the user interface 7 may reduce the size requirements for the beverage machine 100. As shown, the user interface 7 is positioned such that it fits within the footprint or outline of the front side 12 from the front view (e.g., the user interface does not extend past a first edge of the front face). The beverage machine 100 also includes a brew outlet in the brew chamber 15 that is arranged to dispense a beverage along the front face 12 into a cup or container 2 (see FIG. 1). The user interface 7 is positioned off to a side of the dispensing area such that the dispensing area does not block access to the user interface. A user may access the user interface during dispensing of a beverage without getting splashed, and thus minimizing the risk of burns or stains from the liquid. Accordingly, a larger surface area on the front side 12 of the housing 10 is not required to accommodate a user interface that does not interfere with the dispensing area. As such, the corner placement allows the beverage machine 100 to have a smaller footprint at least from the front view. Such a more compact device may be desirable in smaller areas and will also provide more surface or counter space when the beverage machine is positioned on a counter.

Positioning the user interface 7 on the corner 11 of the housing 10 may also allow the user interface 7 to directly access a main circuit board or controller (not shown) in the machine that controls and operates the machine 100. For example, the buttons may be electrically connected to an edge of the main circuit board of the beverage machine. Accordingly, the corner user interface 7 may not require additional circuit boards or other circuitry that a user interface located in another part of the housing 10 may require to be connected to the main circuit board or controller of the machine. As such, parts may be minimized and costs of manufacturing the machine may be reduced.

As shown in FIG. 3, the user interface 7 is also viewable from the right side of the machine 100. A user therefore may access and actuate the buttons of the user interface 7 from the right side of the machine 100, or alternatively, from a left side of the machine if the user interface was arranged on the left corner 16 (FIG. 2). As shown, the user interface 7 is positioned such that it fits within the footprint of the right side 14 from the right-side view (e.g., the user interface does not extend past a first edge of the right side). The corner placement of the user interface 7 may allow the beverage machine 100 to be oriented in different directions on a countertop or other surface, e.g., with the front side facing out (FIG. 2) and/or with the front facing to the side such that the right side is facing out (FIG. 3). This side orientation may allow easier access to the external reservoir 6 located at the back of the machine 100 to easily fill tank 61. The side orientation may also provide more counter depth in front of the machine because the front face 12 is relatively thin from side to side. In addition, the side orientation positions the dispensing area on the front face behind a plane of the user interface such that a user may access the user interface without reaching next to or through the dispensing area.

Figure 4:
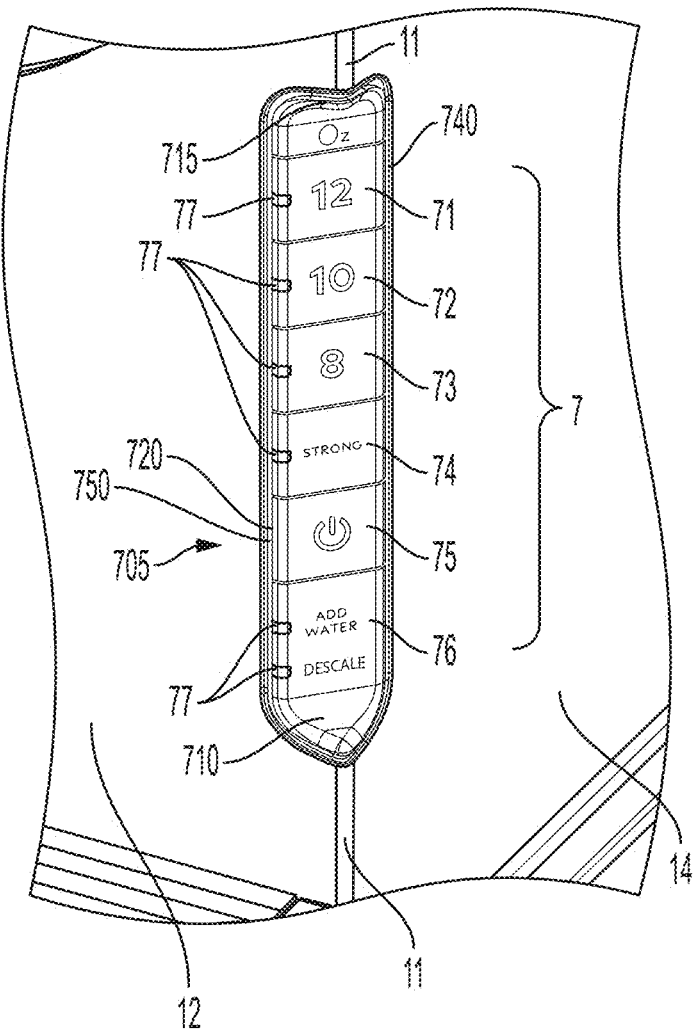
FIG. 4 is an enlarged perspective view of a button array of the beverage dispenser in FIG. 1.

As shown in FIGS. 1 through 4, the front face 12 and side face 14 of housing 10 are planar surfaces. In this embodiment, the front and side surfaces 12, 14 are arranged perpendicular to each other. Of course, the front and side surfaces may also be non-planar and/or may be arranged relative to each other at other angles (e.g., forming an obtuse angle). In some embodiments, a first edge of the front face 12 and a first edge of the side face 14 may form the same edge, e.g., creating a 90-degree corner. In some embodiments, as best shown in FIG. 4, the first edge of the front face 12 and the first edge of the side face 14 may be separate edges, such that the corner 11 forms a third surface therebetween that is different from the front face 12 and the side face 14. The third surface may be a planar surface or curved surface, such that the corner is a rounded or chamfered corner between the front and side faces. In some embodiments, the third surface may form a curved surface between the front face 12 and the side face 14 such that the corner 11 is a smooth, curved surface without any sharp edges.

Figures 5A, 5B:
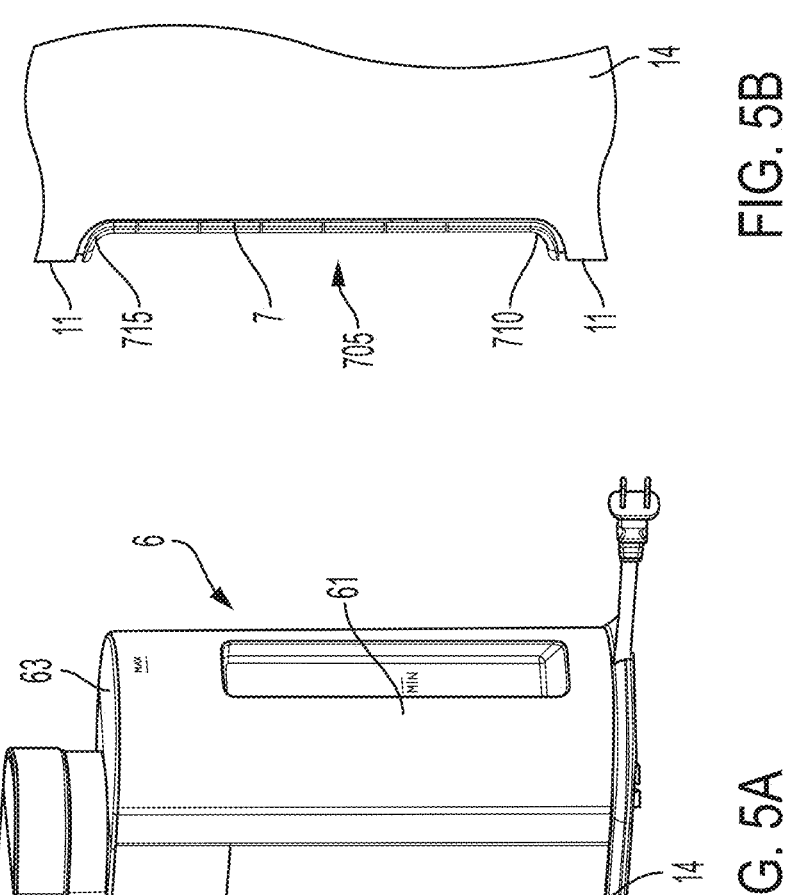
FIG. 5A is a rear right side perspective view of the beverage dispense in FIG. 1.
FIG. 5B is an enlarged view of the button array of FIG. 5A.

As shown in FIGS. 4 and 5A-5B, the user interface may be arranged in a recess 705 at the corner 11 of the housing 10. The user interface 7 may include one or more buttons defining a surface that is at an angle to both the front face 12 and right-side face 14. The corner 11 may be smaller than the recess 705 such that the recess extends from a portion of the front face 12 that is offset from the corner 11 to a portion of the side face 14 that is offset from the corner 11. The one or more buttons may extend partially or completely across a surface of the recess such that a first side 720 of the buttons is adjacent the front face 12 and a second side 740 of the buttons is adjacent the side face 14. The one or more buttons may be rectangular in shape as shown; however, the disclosure is not so limited, and the buttons may be any shape that extends at least partially across the surface of the recess 705. A bottom section 710 and a top section 715 of the recess 705 may curve outwards from the surface of the buttons to the corner 11 in a relatively V-shape. FIGS. 5A and 5B show a perspective view of the beverage machine and an enlarged view of the user interface 7 along a plane parallel to the surface of the buttons. As shown, the recess 705 extends into the housing 10 such that the user interface 7 is positioned inwards relative to an outer perimeter of the housing 10. In this embodiment, the surface of the user interface 7 is a planar surface that is arranged at an angle different than the front face 12 and the side face 14. As noted above, however, the surfaces of the front face, side face, and/or the user interface may not be planar, as the disclosure is not so limited.

Returning to FIG. 4, the user interface 7 includes one or more buttons for inputting different commands to control the beverage machine. For example, the user interface may include buttons 71, 72, and 73 for selecting a beverage size. Pressing one of these buttons may also initiate a brew cycle to form a beverage. Pressing button 73, for example, may initiate a brew cycle to form and dispense an 8-ounce beverage. Of course, other size options and/or a separate button to initiate a beverage formation process may also be provided. The user interface 7 may also include a power button 75 for powering on and off the beverage machine. The user interface may also include a button 76 that allow a user to add water or descale the coffee brewer. These options may be provided on the same or separate buttons. For example, if provided on the same button, a user may press the button more than once to select one or both options. Of course, the user interface may include any number of buttons with various options, including but not limited to, beverage size, temperature, strength, timing, cleaning, etc., as the disclosure is not so limited.

In some embodiments, the buttons may include a light 77 that illuminates when the button is pressed to indicate that the option has been selected. The light 77 may be arranged on the button surface, or the light may be a backlight configured to light up the entire button surface, a button perimeter, or a portion of the button such as text on the button surface. The light may be an LED or other light source.

The buttons may be rectangular in shape and may be mounted to the housing via a hinge mount 750. For example, the buttons may be mounted at a first edge of the button and configured to pivot inwards about the first edge. If the buttons are located on a right front corner of the beverage machine housing, the buttons may be hinge mounted via the hinge mount 750 on a first edge 720 of the buttons such that the second edge 740 of the buttons may pivot inwards. Such a pivot mount combined with the angled orientation of the button, may allow a user to actuate the buttons from directions perpendicular to the front face and perpendicular to the side face, whereas buttons mounted on a front or side surface, or buttons mounted with arrangements other than hinge mounts, may only be accessed or actuated from one direction. In some embodiments the buttons may be provided as membrane switches, tactile switches, or capacitive touch switches, and the hinge-mounted button may activate the switch when pivoted inwards.

In some embodiments, the user interface may be arranged on the housing such that buttons of the user interface may be directly connected to a main circuit board in electrical communication with a controller that operates the beverage machine. As such, the beverage machine may only include a single circuit board and may not require any additional circuit boards on which to mount and electrically connect the buttons of the user interface to the controller. The corner positioned-user interface may thus reduce the number of parts required for the beverage machine and therefore reduce the costs of manufacturing. It should be noted that although buttons are described in this disclosure, the user interface 7 may be arranged in any suitable way and include any suitable components to provide information to a user and/or receive information from a user, such as buttons, a touch screen, a voice command module (including a microphone to receive audio information from a user and suitable software to interpret the audio information as a voice command), a visual display, one or more indicator lights, a speaker, and so on.

What is claimed is:

1. A beverage dispenser comprising:
a housing having a front face and a side face forming a corner oriented vertically on the housing;
a beverage outlet configured to dispense a beverage along the front face; and
a user interface disposed on the corner in the vertical direction, wherein the user interface is viewable from both a front view and a side view, wherein the user interface is disposed in a recess within the housing along a portion of the corner.

2. The beverage dispenser of claim 1, wherein the beverage outlet is defined by a brew chamber configured to receive and hold a cartridge with beverage material for use in forming the beverage.

3. The beverage dispenser of claim 1, wherein the user interface forms a surface at an angle to both the front and side faces.

4. The beverage dispenser of claim 3, wherein the front and side faces are planar, and wherein the surface defined by the user interface is planar.

5. The beverage dispenser of claim 1, wherein the user interface includes one or more buttons that are actuatable from directions perpendicular to the front face and perpendicular to the side face.

6. The beverage dispenser of claim 5, wherein the one or more buttons are hinge mounted at a first edge such that the buttons are configured to rotate about the first edge.

7. The beverage dispenser of claim 5, wherein the one or more buttons are directly connected to a main control board of the beverage dispenser.

8. The beverage dispenser of claim 5, wherein the one or more buttons are tactile switches.

9. The beverage dispenser of claim 5, wherein at least one of the one or more buttons includes a light configured to illuminate when the button is pressed.

10. A beverage dispenser comprising:
a housing having a front face and a side face that meet at a corner oriented vertically on the housing;
a beverage outlet arranged to dispense beverage along the front face; and
a user interface including one or more buttons that are actuatable by a user to provide operating instructions to the beverage dispenser, the one or more buttons being arranged at the corner and defining a surface arranged at an angle to both the front and side faces,
wherein the one or more buttons are disposed in a recess within the housing along a portion of the corner.

11. The beverage dispenser of claim 10, wherein the beverage outlet is defined by a brew chamber configured to receive and hold a cartridge with beverage material for use in forming the beverage.

12. The beverage dispenser of claim 10, wherein the front and side faces are planar, and wherein the surface defined by the one or more buttons is planar.

13. The beverage dispenser of claim 10, wherein the one or more buttons are actuatable from directions perpendicular to the front face and perpendicular to the side face.

14. The beverage dispenser of claim 10, wherein the one or more buttons are hinge mounted at a first edge such that the buttons are configured to rotate about the first edge.

15. The beverage dispenser of claim 10, wherein the one or more buttons are directly connected to a main control board of the beverage dispenser.

16. The beverage dispenser of claim 10, wherein the one or more buttons are membrane switches.

17. The beverage dispenser of claim 10, wherein at least one of the one or more buttons includes a light configured to illuminate when the button is pressed.

18. The beverage dispenser of claim 10, wherein the one or more buttons are tactile switches.

\* \* \* \* \*